UNITED STATES PATENT OFFICE.

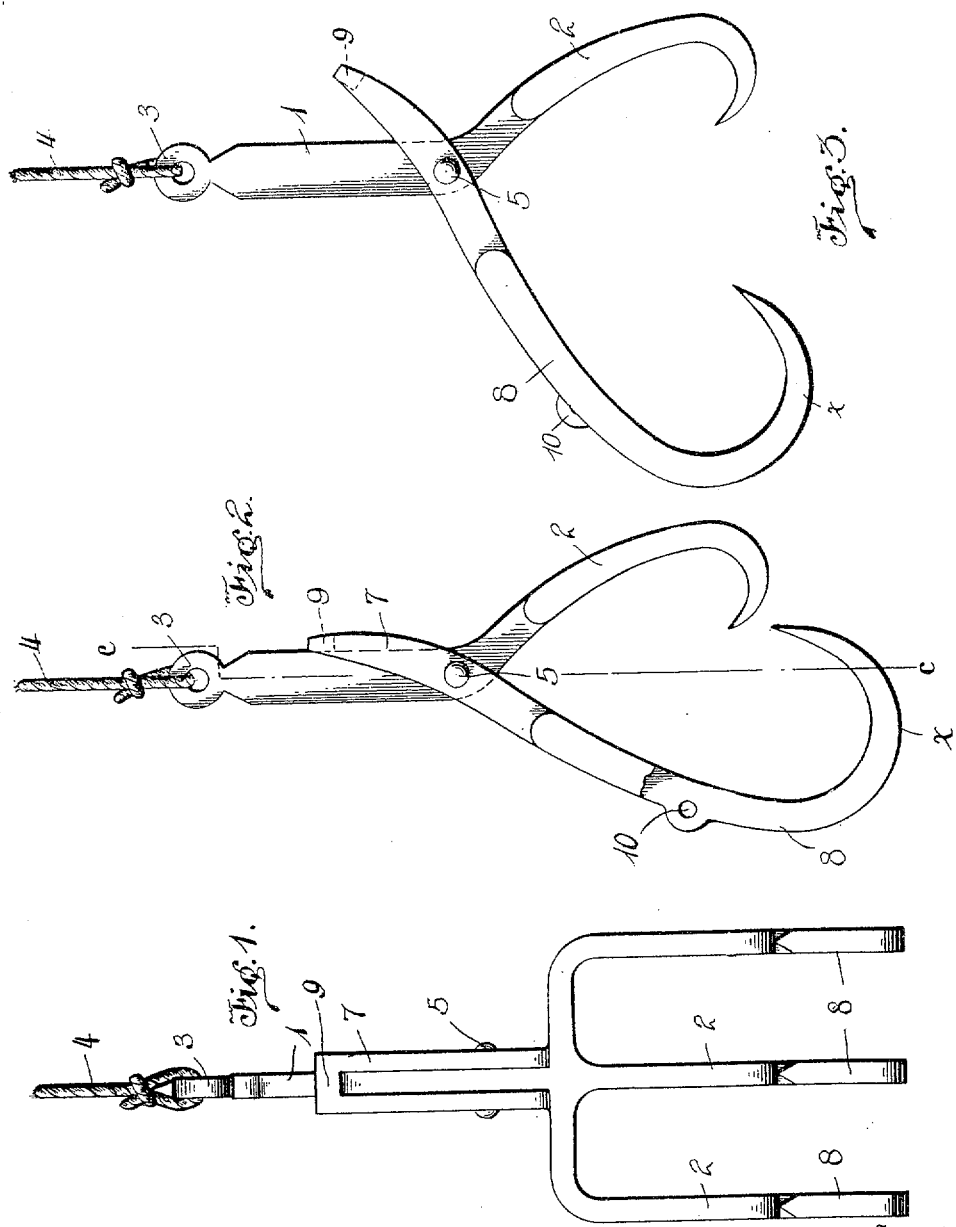

ROBERT T. JONES, OF BEGGS, OKLAHOMA, ASSIGNOR OF ONE-THIRD TO WILLIAM W. HANDY AND THOMAS J. HANDY, BOTH OF BEGGS, OKLAHOMA.

GRAPPLE.

967,130.  Specification of Letters Patent.  Patented Aug. 9, 1910.

Application filed March 28, 1910. Serial No. 551,912.

*To all whom it may concern:*

Be it known that I, ROBERT T. JONES, a citizen of the United States, residing at Beggs, in the county of Okmulgee, State of Oklahoma, have invented certain new and useful Improvements in Grapples; and I do hereby declare the following to be a full, clear, and exact description of the invention, such as will enable others skilled in the art to which it appertains to make and use the same.

This invention relates to devices adapted to be used in grappling buckets, drill tools, timber and the like and is more particularly to be used in grappling and raising submerged bodies; and consists in an improved construction of grappling hooks, comprising a projecting freely pivoted base hook and a shorter strand carried clasping hook arranged so that as the base or larger projecting hook strikes the ground it will actuate to rock the grapple in such a manner that the same will be opened.

In the accompanying drawings:—Figure 1 shows an end view of a grapple embodying my invention. Fig. 2 is a side view thereof. Fig. 3 shows the grapple opened.

In carrying out the object of my invention, I use what I term a clasping hook 1 having the recurved teeth 2 and the terminal eye 3 to which eye is secured the grappling line 4 by means of which the grapple is raised and lowered. This clasping hook carries the pin 5 which pivotally receives the base hook as used in my invention. This base hook consists of a pair of members 7 between which passes the stem of the clasping hook 1 and these members are carried on the pivot pin 5. At the upper end the members are connected by a cross bar 9 which forms a stop shoulder and bears against the stem of the member 1 when the grapple is suspended without grasping an object. Furthermore, this clasping hook is provided with recurved teeth 8.

In Fig. 2 the lines $c$—$c$ represent the axis of the clasping hook 1. The lowest recurved point of the teeth 8 marked $x$ it will be noticed is located to one side of the center line $c$, the end of the teeth however extending beyond said line toward the opposite side. The lowest portion of the teeth of the clasping hook it will also be noticed ends at a point above the end of the hooks or teeth 8. The ends of the teeth 2 and 8 end in a common plane situated upon the side of the clasping hook as shown.

Now, when a grapple constructed according to my invention is lowered the lowest point $x$ of the projecting teeth 8 will first come in contact with the ground or other object and be actuated to rock the grapple in such a manner that as the grappling line is lowered, the hooks will be opened to seize or clasp the object with which it comes into engagement, assuming of course that the grapple is large enough to clasp the same.

As it is sometimes necessary to open the grapple manually the center one of the teeth 8 is provided with an eye 10 best seen in Fig. 2 where one of the outside teeth has been broken away. To this eye a suitable cord may be attached when deemed necessary and upon pulling this cord the grapple will be opened.

By means of this mechanical appliance tools and other objects may be removed from wells while the device is also adapted to be used in raising snag and other obstructions from the bottom of rivers and the like.

Having thus described the invention, what is claimed as new, is:—

1. In a grapple, a clasping hook having a line receiving opening at one end and recurved teeth at the other, a base hook pivotally secured to said clasping hook and also having recurved teeth, the recurved teeth of said base hook terminating below said clasping teeth, and a stop shoulder secured to said base hook adapted to be brought into engagement with said clasping hook, all arranged as set forth.

2. In a grapple, a clasping hook having a stem provided with a line receiving opening at its upper end, recurved teeth formed on the other end of said stem, a base hook pivotally secured to said clasping hook and also having recurved teeth, the recurved teeth of the clasping hook terminating at a uniform distance from a plane passing through the center of the stem of said clasping hook and the recurved teeth of the base hook passing through said plane and terminating below the points of the teeth of the clasping hook, said base hook teeth being provided with bight portions adapted to contact with the ground and located below the teeth of the clasping hook.

In testimony whereof, I affix my signature, in presence of two witnesses.

ROBERT T. JONES.

Witnesses:
VAN H. ALBERTSON,
LOUISE ROBINSON.